United States Patent [19]

Hills

[11] 3,867,439

[45] Feb. 18, 1975

[54] PREPARATION OF POTASSIUM BENZOATE

[75] Inventor: David J. Hills, Brantford, Ontario, Canada

[73] Assignee: The Dow Chemical Company, Midland, Mich.

[22] Filed: Apr. 17, 1972

[21] Appl. No.: 244,898

[52] U.S. Cl. .............................................. 260/525
[51] Int. Cl. ...................... C07c 63/02, C07c 63/08
[58] Field of Search ........................ 260/515 R, 525

[56] References Cited
UNITED STATES PATENTS 3,259,651   7/1966   Schenk et al. ...................... 260/525
3,309,289   3/1967   Messina et al. ...................... 260/525

Primary Examiner—James A. Patten
Attorney, Agent, or Firm—David H. Thurston; Glwynn R. Baker

[57] ABSTRACT

Substantially pure potassium benzoate is obtained in high yield by reacting an aromatic hydrocarbon solution of benzoic acid such as that obtained from a toluene oxidation process with potassium hydroxide preferably in concentrated aqueous solution, thereby precipitating solid potassium benzoate.

10 Claims, No Drawings

PREPARATION OF POTASSIUM BENZOATE

BACKGROUND OF THE INVENTION

This invention relates to an efficient and direct process for converting impure benzoic acid in aromatic hydrocarbon solution to pure potassium benzoate. It relates particularly to such a process adapted for use in conjunction with the manufacture of benzoic acid by the air oxidation of toluene.

Potassium benzoate is used as the starting material in the disproportionation process for making terephthalic acid. In the past, the potassium salt has been made by neutralizing pure benzoic acid with potassium hydroxide or carbonate in aqueous solution, then evaporating and spray drying the product. This method requires an initial isolation of pure benzoic acid and involves relatively expensive evaporation and drying steps.

Potassium benzoate also finds application in purifying the effluent gases from sulfur plants, being used as a catalyst to convert traces of sulfur dioxide present in the effluent to elemental sulfur.

An important process for making benzoic acid is that wherein liquid toluene is oxidized in the presence of a heavy metal oxidation catalyst at about 100°–200°C using molecular oxygen as the oxidizing agent. Cobalt and manganese compounds, usually salts of an organic acid such as cobalt acetate, cobalt naphthenate, or a corresponding manganese salt are commonly used catalysts. The liquid effluent of this process is essentially a solution of benzoic acid and the metal compound in toluene, usually of about 30 per cent by weight concentration of benzoic acid. Small amounts of products representing intermediate stages of oxidation such as benzaldehyde, benzyl alcohol, and benzyl esters as well as other related byproducts are also present. Benzoic acid is conventionally isolated from this effluent by a multistage distillation procedure. When it is attempted to extract the benzoic acid from the toluene solution with aqueous base, stable emulsions are formed when relatively concentrated basic solutions are used and the use of dilute base involves evaporation of an undesirably large volume of water to obtain the dry potassium benzoate. In both the distillation and extraction procedures, contaminating amounts of the process impurities tend to remain in the recovered product.

SUMMARY OF THE INVENTION

It has now been discovered that in an aromatic hydrocarbon solution generally and in a toluene solution such as the effluent of a toluene oxidation process as described above particularly, benzoic acid is recovered efficiently and in high purity as the potassium salt by adjusting the benzoic acid concentration to about 5–30 per cent by weight, preferably to 10–20 per cent, adding potassium hydroxide to the solution, preferably in about the stoichiometric amount required to react with the benzoic acid, i.e., mole per mole, whereupon most of the benzoic acid is precipitated as solid potassium benzoate. Surprisingly, the precipitated salt is granular in nature and so is easily separated as pure potassium benzoate from the resultant slurry by filtration, decantation, or other such means. Upon washing with solvent to remove possible impurities in the adhering mother liquor and drying at 100°–200°C to drive off both solvent and any water of hydration, anhydrous potassium benzoate of high purity is obtained.

DETAILED DESCRIPTION

Benzoic acid solutions in aromatic hydrocarbons such as benzene, toluene, or xylene may be produced as byproduct streams or mother liquors from various chemical processes. Such a solution, however, is most commonly encountered as the liquid effluent from toluene oxidation. This effluent contains dissolved metal oxidation catalyst, ordinarily a cobalt compound, which must be removed before it can be used in the present process to produce pure potassium benzoate.

Such dissolved metal catalyst can be removed from the liquid effluent by selective precipitation, by ion exchange resin treatment, or by other known purification means. A particularly effective method is aqueous extraction of the toluene solution, preferably with dilute aqueous mineral acid. Dilute acid containing 5–30 per cent by weight of one or more of the common mineral acids hydrochloric acid, nitric acid, and sulfuric acid is preferred as the aqueous extractant. It has been found that in extraction with dilute aqueous acid as specified, substantially complete metal catalyst removal is obtained with minimal loss of benzoic acid when the toluene solution is extracted with a minor proportion of the aqueous acid, for example, with 0.02–0.2 volumes per volume of toluene solution. A single extraction is usually sufficient to reduce the cobalt or manganese content of the effluent to trace amounts.

A further advantage of this new process as applied to the effluent of a toluene oxidation process is the increased recovery of certain byproducts as compared to known methods. For example, a principal class of byproducts formed by the oxidation includes benzyl alcohol and certain of its esters. When the known distillation procedure is used to recover toluene and benzoic acid, benzyl alcohol is largely converted to benzyl benzoate in the presence of relatively high benzoic acid concentrations at the distillation temperature. This high boiling ester is not easily recoverable and so represents a material loss. In the present process, benzyl alcohol remains unchanged and benzyl formate is saponified to the alcohol. Benzyl alcohol thereby constitutes a significant and valuable byproduct which is easily recoverable from the toluene mother liquor.

If, on the other hand, there is no requirement for byproduct benzyl alcohol, it can be recycled to the toluene oxidation reactor. The overall yield of benzoic acid under these conditions will be higher than in the conventional process where significant amounts of benzyl alcohol and benzoic acid are lost as benzyl benzoate.

The potassium hydroxide can be added as a solid but it is preferable to handle it as a liquid for a number of reasons: (1) it is more conveniently transferred and metered in as a liquid, (2) the rate of reaction is greater with liquid base, and (3) the risk of contamination of solid potassium benzoate with unreacted solid potassium hydroxide is eliminated. A problem commonly encountered in processes in which a solid reactant is converted to a solid product is that the particles of reactant become coated with solid product, making completion of the reaction difficult of attainment.

The potassium hydroxide can be employed as a liquid aqueous solution of at least 40 per cent by weight concentration, as a hydrated solid, or even as solid 100% KOH. Liquid aqueous KOH of about 50–66 per cent concentration is most convenient and is preferred.

Operating at concentrations below 40 percent is economically unattractive because an appreciable fraction of the potassium benzoate product dissolves in the excess water and this constitutes a serious yield loss. Indeed, at potassium hydroxide concentrations much below about 30 percent, there may be no solid potassium benzoate precipitated at all.

The problems likely to be encountered with liquid base at higher potassium hydroxide concentrations are best understood by considering the freezing point of aqueous KOH at these concentrations. If concentrations greater than about 66 percent KOH are used, with the exception noted below, the temperature of the reactor will have to be maintained above the atmospheric pressure boiling point of toluene if the KOH is to be kept liquid. In carrying out the process in this region of high KOH concentration, one can either operate the reactor under pressure in order to maintain the temperature above that of the normal boiling point of toluene, or one can add molten KOH solution at a temperature above 110° to the toluene phase at a lower temperature and allow the reaction to occur at that lower temperature. Under the latter conditions, the KOH initially will be partially precipitated as solid upon contact of the two reactants.

At KOH concentrations between about 86 and 88 percent it is possible to maintain the KOH liquid at temperatures below the normal boiling point of toluene, because a eutectic occurs at 87 percent KOH. This narrow range of about 86–88% concentration is another range in which the reaction can be carried out conveniently.

As mentioned before, the KOH can be added as a solid, preferably finely divided. The hydrated material or the anhydrous solid can be used in this mode of operation. Since the presence of water enhances the rate of reaction, hydrated base of up to about 92 percent KOH content is preferable. The reaction is slow with 95 percent KOH and very slow with the anhydrous material.

The quantity of KOH to be added is preferably the stoichiometric quantity required to react with the benzoic acid present so as both to obtain the maximum conversion and avoid contamination of the precipitated salt with excess free base. In some cases, it may be desirable to use less than the theoretical amount of KOH, for example, 50–90 percent of that quantity or 0.5–0.9 mole per mole of benzoic acid, for convenience in operation or possibly to enhance the purity of the product. About 0.9–1 mole of KOH per mole of benzoic acid is usually most preferred. Best results are obtained in a continuous neutralization by combining acid and base solution in essentially stoichiometric proportions whereby the pH of the product is maintained at about 7.5–9.

The temperature at which the reaction is carried out is not critical, any temperature between the crystallization point of the benzoic acid solution and about 150°C being suitable. It is convenient, however, to operate between ambient temperature and the normal atmospheric pressure boiling point of the toluene phase. One convenient method of carrying out the process is to remove the heat of reaction by allowing the toluene vehicle to boil under reflux. Many other practical and convenient modes of operation will be obvious to those experienced in the design and operation of chemical reactors.

The solid potassium benzoate is removed from the reactor product by any suitable means such as by filtration, centrifugation and the like. It is convenient but by no means necessary to cool the reactor product prior to removing the solid potassium benzoate. When using relatively dilute (<65 percent) KOH, a hot reaction mixture may contain an aqueous phase in which is dissolved some of the potassium benzoate product. Under these conditions it is advantageous to cool the reactor product prior to filtration so as to minimize the amount of potassium benzoate lost in this aqueous phase.

Somewhat surprisingly, when sodium hydroxide is substituted in the process in an attempt to isolate sodium benzoate, an impure, gummy or slimy product is formed. No practical separation of pure sodium salt appears to be possible by this method.

EXAMPLE 1

The effluent liquor from a toluene oxidation process was extracted with about one tenth its weight of a mixture of about equal volumes of dilute hydrochloric and nitric acids to remove the cobalt oxidation catalyst. The extracted liquor, which was essentially a solution of about 30 percent by weight benzoic acid in toluene, was diluted with toluene to a benzoic acid concentration of 8.3 per cent. To 100 g. of this solution at 75°C was added 3.81 g. of potassium hydroxide as a 60.8 weight per cent water solution and the resulting suspension of hydrated potassium benzoate was stirred for 10 minutes at that temperature. The solid potassium benzoate hydrate was filtered off, washed with toluene, and dried at 180°C to obtain 10.2 g. of anhydrous salt assaying better than 99 per cent purity, representing a recovery of 95 per cent of the theoretical quantity.

EXAMPLES 2–4

Using the general procedure of Example 1, samples of a cobalt-free toluene oxidizer effluent were diluted with toluene to various benzoic acid concentrations and these were reacted with the stoichiometric quantities of aqueous KOH in different concentrations to determine the effects on yield and purity of the potassium benzoate product.

| Concentration, Weight % | | Potassium Benzoate | |
|---|---|---|---|
| Benzoic Acid | KOH | % Recovery | % Purity |
| 8.3 | 55.7 | 93 | 99.2 |
| 7.4 | 61.6 | 96.5 | 99.1 |
| 14.7 | 59.2 | 97 | 99.7 |

EXAMPLES 5–8

Prolonged stirring of the hydrated potassium benzoate in toluene slurry tends to break down the hydrate and liberate some of the water, thereby forming an aqueous phase containing dissolved benzoate and reducing the recovery. This effect is shown in the following examples where samples of diluted cobalt-free oxidizer effluent containing 14.4 percent benzoic acid were reacted with the stoichiometric quantities of aqueous KOH of various concentrations and the resulting slurries were stirred for 1 hour at 30°C. The originally precipitated salt and that in the final slurry were analyzed for water content.

| Wt. % Concentration aq. KOH | % Water Retained | % Recovery of Benzoate |
|---|---|---|
| 44.1 | 41.3 | 69.5 |
| 51.6 | 41.4 | 77.8 |
| 60.9 | 74.0 | 88.0 |
| 65.5 | 96.2 | 97.2 |

EXAMPLE 9

This example demonstrates the practicality of using KOH concentrations near the eutectic at 87 percent. Dropwise addition of 7.7 g. of 87 percent aqueous KOH solution at 120°C to 97.4 g. of metal-free toluene oxidation effluent solution containing 15 percent benzoic acid at room temperature afforded a fine precipitate which was easily filtered on a Buchner funnel. The cake was washed with toluene and dried at 100°C. The dried potassium benzoate product weighed 19 grams which represents a virtually quantitative yield.

EXAMPLES 10–12

The following examples show how the invention may be carried out using powdered solid KOH and the effect of varying the amount of water in the KOH.

A toluene oxidation effluent solution was extracted to remove metal catalyst and adjusted to 10 percent benzoic acid concentration by adding toluene. To each of three portions of this solution was added with continual stirring the stoichiometric quantity of powdered solid KOH at room temperature. The results are summarized in the following table.

| KOH Concentration % | Observations |
|---|---|
| 74 | Reaction complete in 5 minutes. |
| 95 | About a quarter of the KOH had reacted after 10 minutes. |
| 100 | A small portion of the KOH had reacted after 10 minutes. |

EXAMPLE 13

Subsequent to the laboratory tests, a mini plant was constructed and operated as described below to produce 5 lbs./hr. of purified potassium benzoate by the present process.

The oxidation product of a toluene oxidation reactor was extracted with a 1 percent aqueous hydrochloric acid solution to reduce its cobalt oxidation catalyst content to less than 1 ppm. The essentially cobalt-free material was then diluted with fresh toluene to make a solution containing 15 percent by weight of benzoic acid.

Continuous neutralization of this solution with 60–62 percent aqueous potassium hydroxide was carried out by metering the two solutions in essentially the stoichiometric proportions into a two liter reactor equipped with a 1500 rpm combination anchor and turbine impeller. The residence time in the reactor was 4 minutes. The stoichiometric balance was achieved by sampling the slurry effluent from the reactor, extracting with an equal volume of water, measuring the pH of the extract and adjusting the flow of the potassium hydroxide to maintain an essentially constant pH of about 8. The benzoic acid feed was kept at 50°–55°C and the potassium hydroxide solution at 80°–85°C. A cooling jacket around the reactor cooled the slurry to 50°–55°C during neutralization.

The potassium benzoate slurry thereby obtained was filtered and the filter cake was washed with fresh toluene to remove organic impurities such as benzaldehyde, benzyl alcohol and benzyl benzoate. After two washings, each with a quantity of toluene equal to 75 percent of the dry cake weight, the dried potassium benzoate contained less than 0.2 percent impurities. The moisture content was 0.4 percent. The bulk density of the ground material was 31 lbs./cu. ft.

I claim:

1. In the process wherein liquid toluene is oxidized to benzoic acid by molecular oxygen in the presence of a heavy metal compound catalyst at about 100°–200°C., thereby producing a liquid process effluent consisting essentially of a toluene solution of benzoic acid and said metal compound, the improvement whereby benzoic acid is separated from said effluent as the substantially pure potassium salt by treating the liquid effluent to remove at least a substantial part of said heavy metal compound and to adjust the benzoic acid concentration to about 5–30 percent by weight, adding potassium hydroxide containing up to 60 percent by weight of water to the adjusted effluent at a temperature between the crystallization point of the benzoic acid solution and about 150°C., thereby forming a slurry of solid potassium benzoate in the toluene and separating said potassium benzoate from said slurry.

2. The process of claim 1 wherein about 0.5–1 mole of potassium hydroxide is added per mole of benzoic acid.

3. The process of claim 1 where about a mole of potassium hydroxide is added per mole of benzoic acid.

4. The process of claim 1 wherein the potassium hydroxide is added as a powdered solid.

5. The process of claim 1 wherein the potassium hydroxide is employed as a liquid aqueous solution.

6. The process of claim 5 wherein the aqueous solutions contains 50–66 per cent by weight of KOH.

7. The process of claim 1 wherein the benzoic acid solution contains 10–20 per cent by weight of benzoic acid.

8. The process of claim 1 wherein the metal compound is removed from the liquid effluent by an aqueous extraction.

9. The process of claim 8 wherein the aqueous extraction is carried out using a minor proportion based on the liquid effluent of dilute aqueous mineral acid as the aqueous extractant wherein the mineral acid is hydrochloric acid, nitric acid, sulfuric acid, or a mixture thereof.

10. The process of claim 1 wherein the potassium hydroxide is added to the adjusted benzoic acid solution at between ambient temperature and the boiling point of the solution.

* * * * *

PO-1050
(5/69)

UNITED STATES PATENT OFFICE
CERTIFICATE OF CORRECTION

Patent No. 3,867,439            Dated February 18, 1975

Inventor(s) David J. Hills

It is certified that error appears in the above-identified patent and that said Letters Patent are hereby corrected as shown below:

Col. 4, line 13, delete "substiuted" and insert --substituted--

Col. 5, in the table, first column, second line in the heading, delete "ag." and insert --aq.--

Col. 6, line 16, insert --organic-- after "percent"

Col. 6, line 47, delete "solutions" and insert --solution--

Signed and sealed this 13th day of May 1975.

(SEAL)
Attest:

RUTH C. MASON
Attesting Officer

C. MARSHALL DANN
Commissioner of Patents
and Trademarks